United States Patent
Gamble, II et al.

(10) Patent No.: US 11,142,874 B2
(45) Date of Patent: *Oct. 12, 2021

(54) HOPPER SPREADER WITH BACK EMF CONTROL AND HOPPER SYSTEM SPEED CONTROL

(71) Applicants: Robert N. Gamble, II, Watertown, WI (US); Terry Wendorff, Slinger, WI (US)

(72) Inventors: Robert N. Gamble, II, Watertown, WI (US); Terry Wendorff, Slinger, WI (US)

(73) Assignee: Sno-Way International. Inc., Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,988

(22) Filed: Apr. 16, 2019

(65) Prior Publication Data

US 2019/0242073 A1    Aug. 8, 2019

Related U.S. Application Data

(63) Continuation of application No. 15/237,326, filed on Aug. 15, 2016, now Pat. No. 10,370,800.

(51) Int. Cl.
*H02P 7/29* (2016.01)
*H02P 5/46* (2006.01)
(Continued)

(52) U.S. Cl.
CPC ............ *E01C 19/20* (2013.01); *E01C 19/203* (2013.01); *H02P 5/46* (2013.01); *H02P 7/29* (2013.01);
(Continued)

(58) Field of Classification Search
CPC .......... E01C 19/20; E01C 19/203; H02P 5/46; H02P 7/29; H02P 7/2913; H02P 27/08; H02P 6/17
(Continued)

(56) References Cited

U.S. PATENT DOCUMENTS 3,568,027 A * 3/1971 Bacon ................... H02P 7/2885
388/823
3,677,540 A    7/1972 Weiss
(Continued)

OTHER PUBLICATIONS

STMicroelectronics, ST7214 I, 8-Bit MCU with SK ROM/OTP/EPROM, 256 Bytes RAM, Electric-Motor Control, ADC, WDG, SPI and 2 Timers, (Jul. 1998).
(Continued)

*Primary Examiner* — Kawing Chan
(74) *Attorney, Agent, or Firm* — Reinhart Boerner Van Deuren P.C.

(57) ABSTRACT

A method of controlling a DC motor that includes the step of providing a pulse-width modulation (PWM) signal to the DC motor. The PWM signal provides a voltage to operate the DC motor. The method also includes the steps of measuring a voltage generated by the DC motor when the PWM signal is off. In more particular embodiments, the method includes measuring a current being supplied to the DC motor when the PWM signal is off. The method may further require determining a motor speed of the DC motor based on the measured voltage. The method further includes controlling the DC motor to maintain a relatively constant motor speed with varying loads on the DC motor.

21 Claims, 9 Drawing Sheets

(51) Int. Cl.
*H02P 27/08* (2006.01)
*H02P 6/182* (2016.01)
*H02P 6/17* (2016.01)
*E01C 19/20* (2006.01)

(52) U.S. Cl.
CPC ............ *H02P 7/2913* (2013.01); *H02P 27/08* (2013.01); *E01C 2019/208* (2013.01); *H02P 6/17* (2016.02); *H02P 6/182* (2013.01)

(58) Field of Classification Search
USPC ........................................................ 318/599
See application file for complete search history.

(56) References Cited

U.S. PATENT DOCUMENTS

| | | | |
|---|---|---|---|
| 3,929,292 A | 12/1975 | Phillips | |
| 4,111,272 A | 9/1978 | Ricciardi et al. | |
| 4,292,574 A * | 9/1981 | Sipin | H02P 7/291 318/459 |
| 4,773,598 A * | 9/1988 | Jones | B60P 1/165 239/657 |
| 5,501,403 A * | 3/1996 | van Vooren | E01H 10/007 239/662 |
| 5,656,912 A * | 8/1997 | Yang | H02P 25/04 318/432 |
| 5,842,649 A | 12/1998 | Beck et al. | |
| 5,860,604 A | 1/1999 | Kooiker | |
| 5,870,363 A * | 2/1999 | Sun | G11B 19/24 369/47.45 |
| 6,262,553 B1 | 7/2001 | Menze | |
| 6,422,490 B1 | 7/2002 | Truan et al. | |
| 6,508,419 B1 | 1/2003 | Kinkead et al. | |
| 6,621,014 B1 | 9/2003 | Tanner et al. | |
| 7,066,413 B2 | 6/2006 | Musso et al. | |
| 7,748,652 B2 | 7/2010 | Musso et al. | |
| 8,067,704 B2 | 11/2011 | Lowe et al. | |
| 8,136,706 B2 | 3/2012 | Jung | |
| 8,390,226 B1 * | 3/2013 | Krishnamoorthy | H02P 6/08 318/432 |
| 8,587,228 B2 | 11/2013 | Anderson | |
| 8,800,825 B2 | 8/2014 | Ricciardi, Sr. et al. | |
| 9,033,265 B2 * | 5/2015 | Truan | B05B 3/1035 239/661 |
| 9,078,412 B2 | 7/2015 | Dube | |
| 10,370,800 B2 * | 8/2019 | Gamble, II | H02P 5/46 |
| 2004/0007998 A1 * | 1/2004 | Yasohara | H02P 6/10 318/437 |
| 2005/0046375 A1 | 3/2005 | Maslov et al. | |
| 2005/0204587 A1 * | 9/2005 | Kime | E01H 10/007 37/266 |
| 2005/0246088 A1 * | 11/2005 | Doherty | E01H 10/007 701/80 |
| 2007/0069674 A1 | 3/2007 | Koeppl et al. | |
| 2008/0001570 A1 * | 1/2008 | Gaetani | H02P 21/0089 318/721 |
| 2009/0230905 A1 | 9/2009 | Proctor | |
| 2010/0070073 A1 * | 3/2010 | Foley | G01G 13/003 700/240 |
| 2011/0221367 A1 * | 9/2011 | Perisic | H02P 21/12 318/400.02 |
| 2012/0234934 A1 | 9/2012 | Score et al. | |
| 2014/0151460 A1 * | 6/2014 | Noffsinger | B61C 15/10 239/69 |
| 2016/0017551 A1 | 1/2016 | Wendorff et al. | |
| 2016/0083651 A1 * | 3/2016 | Phillips | A01N 25/08 427/212 |
| 2016/0233802 A1 * | 8/2016 | Dernebo | F04D 29/663 |
| 2016/0258655 A1 | 9/2016 | Pfaffl et al. | |
| 2016/0356005 A1 * | 12/2016 | Dolinar | E01C 23/22 |
| 2018/0044863 A1 | 2/2018 | Gamble, II et al. | |

OTHER PUBLICATIONS

STMicroelectronics, AN2030, Application Note Back EMF Detection during PWM on time by ST?MC, (Jul. 16, 2007).
Microchip Technology Inc., AN894 Motor Control Sensor Feedback Circuits, (Nov. 24, 2003).
Merrick Industries, Inc., Merrick Volumerik(registered TM) Screw Feeder Series 100 (Merrick-Series 100 Volumetric Feeders), (Jun. 27, 2001).
RPL-6620 controller—exact replacement for 3006620 Buyers SaltDogg -3014199, offered on Ebay by Seller: garyae (Jan. 17, 2018) (https://www.ebay.com/itm/RPL-6620-controller-exact-replacement-for-3006620-Buyers-SaltDogg-3014199/181646601375?hash=item2a4afb2c9f:g: YSoAAOSwImRYmafT).
Bodine Electric Company, NEMA 0816 Remote Speed Control—Filtered SCR DC Remote Speed Control, (Jul. 3, 2018) (http://www.bodineelectric.com/Asp/ProductSeries.asp?Context=20&Name=Filtered&20SCR%20DC%20Remote%20Speed%20Control).
Bodine Electric Company, Low-Voltage PWM DC Motor Speed Control (open chassis), Model 0786 (Jul. 3, 2018) (http://www.bodine-electric.com/Asp/ProductModel.asp ?Context=20&Name=Low%2DVoltage+PWM+DC+Motor+Speed+Control+%28open+chassis%29&Model=0786).
U.S. Appl. No. 15/237,326, filed Aug. 15, 2016.

* cited by examiner

HOPPER SPREADER WITH BACK EMF CONTROL AND HOPPER SYSTEM SPEED CONTROL

CROSS-REFERENCE TO RELATED PATENT APPLICATION

This patent application is a continuation, of U.S. patent application Ser. No. 15/237,326, filed Aug. 15, 2016, the entire teachings and disclosure of which are incorporated herein by reference thereto.

FIELD OF THE INVENTION

The present invention relates generally to hopper spreaders and more particularly to hopper spreaders having a flow regulator configured to regulate flow of particulate material from the container.

BACKGROUND OF THE INVENTION

The spreading of salt or other ice-melting materials as well as traction improving materials is a requirement in many areas for maintaining roads and driveways during the winter months. Various types of spreader units have been developed for spreading granular dry, free flow materials. Many such spreader units have been designed for mounting on vehicles such as trucks, either on the receiver of smaller trucks, or in the bed of larger commercial trucks that are used in wintertime road and driveway maintenance.

Spreaders generally hold a supply of granular material such as sand, rock salt, flake (calcium chloride), and/or bagged ice melters for distribution over a surface. Spreaders may be mounted in or on a vehicle which may be driven over the surface to be treated. The material moves from a hopper to a motor-driven spinner that distributes the material to the surface over which the vehicle moves.

Because salt spreaders are not used year round, they are generally removably mounted on the receiver of a truck, or, in the case of larger spreaders, in the bed of trucks. In either event, spreaders have a discharge outlet at the bottom of the hopper through which the particulate material, such as salt or sand, falls onto a spinning assembly or spinner. The spinner that is rotated by a drive assembly including an electric or hydraulic motor that causes the spinner to spread the particulate material discharged from the hopper over a wide distribution area behind the truck. The speed of the spinner may typically be varied to control the size of the area over which the particulate material is distributed.

In V-box spreaders and tail gate spreaders, the need for varying motor speeds is essential for optimum material spreading capabilities. The motors that are regulated in speed range from spinner motors, auger motors, vibrator motors, drum drives, drag chain drives and wetting systems drives. As used herein, "wetting system" refers to a system for dispensing wetting solution onto anti-icing material so that, among other things, the material does not stick together and disperses in the manner desired. All of the above-mentioned motors, when varied in speed, maximize profits for the customer, while maintaining conservation on material usage and optimizing material effectiveness against ice and snow.

One issue however with varying speed on motors is that they typically lose performance when throttled back or run at low speeds. This has to do with the way the motors are regulated in speed. The net effect is that a customer cannot utilize the full rpm range of the spreader, and therefore limited in what the spreader can do, especially at low rpm settings. It is not uncommon for customers to run the spreader at full speed at all times mostly because of the spreader limitations.

Vibrators are used in spreaders of all sorts including, but not limited to, tail gate hopper spreaders and v-box auger/pintel chain spreaders. The purpose of the vibrator is to jar loose material from a bridged condition or stuck to the walls of the hopper so that the material falls down through the spreader and ultimately onto the spinner.

One problem that is encountered is where turning the vibrator "on" can have undesirable consequences to either spreader performance or to overall pattern output. The ability to turn the vibrator "on" and "off" at the right time is advantageous with respect to optimum spreader performance. This prevents the spreader from jamming up and tends to maximize the spreader pattern so there is no disruption in material dispersion. Further, it can be difficult to predict when to turn on and off the vibrator while spreading the material as the operator is typically facing forward while the material is being spread behind the operator. Thus, the operator is not always looking at the material exiting the hopper spreader to know whether or not the vibrator needs to be activated. Some materials can be over vibrated such that if too much vibration is provided, the materials will pack such that it will not flow out of the hopper. Thus, simply leaving the vibrator on at all times while operating the hopper spreader is not an ideal option.

Bridged material that becomes jammed in the spreader may lead to the material becoming oversaturated with wetting solution, or may lead to the wetting solution being dumped into the chute without any material being dispensed.

The present invention pertains to improvements in the state of the art with respect to hopper spreaders. These and other advantages of the invention, as well as additional inventive features, will be apparent from the description of the invention provided herein.

BRIEF SUMMARY OF THE INVENTION

In one aspect, embodiments of the invention provide a method of controlling a DC motor. The method includes the steps of providing a pulse-width modulated (PWM) signal to operate the DC motor, measuring a voltage generated by the DC motor when the PWM signal is turned off, and determining a motor speed of the DC motor based on the measured voltage. The method further includes controlling the DC motor to maintain a relatively constant motor speed which corresponds to a desired motor speed setting. The relatively constant motor speed is maintained with varying loads placed on the DC motor. In the context of the present invention, "relatively constant motor speed" is defined to be within plus or minus 10 percent of the desired speed setting.

The aforementioned method may further include controlling the PWM signal to increase the voltage to the DC motor as the load on the DC motor increases, and to decrease the voltage to the DC motor as the load on the DC motor decreases.

In a particular embodiment, measuring the voltage includes measuring the voltage using a microprocessor. Furthermore, measuring the voltage using a microprocessor may include measuring the voltage using a microprocessor with an integral analog-to-digital converter.

In a further embodiment, the method calls for measuring the current supplied to the DC motor when the PWM signal is turned off. In more particular embodiments, the voltage and current measurements occur within 3 milliseconds of each other. In certain embodiment, the method also includes determining a torque produced by the one or more DC motors based on the measured current.

The method may further include providing a second pulse-width modulated (PWM) signal to operate a second DC motor, measuring a voltage generated by the second DC motor when the second PWM signal is turned off, and automatically activating a light when the measured voltage indicates that the second DC motor is operating. In a particular embodiment, the second DC motor is one of an auger motor, a spinner motor, and a wetting system motor. In an alternate embodiment, the second DC motor is one of a spinner motor, and a wetting system motor and the DC motor is one of an auger motor, and a conveyor motor. In yet another embodiment, the DC motor is one of a spinner motor, an auger motor, and a conveyor motor.

In a further embodiment, the method calls for providing a second pulse-width modulated (PWM) signal to operate an auger motor, measuring a voltage generated by the auger motor when the second PWM signal is turned off, determining a material flow rate through the auger based on the measured voltage, and automatically activating a vibrator when the material flow rate is below a first threshold value. The method may also include automatically deactivating the vibrator when the material flow rate is above a second threshold value. In certain embodiments, the method includes using GPS data to correlate a material dispersion pattern to vehicle location coordinates and/or weather patterns.

In a further embodiment, the method calls for determining a material flow rate through an auger, with an electric motor, by measuring a voltage from the auger's electric motor when a PWM supply voltage to the electric motor is turned off, automatically activating a wetting system if the material flow rate is above a first threshold value, and automatically deactivating the wetting system if the material flow rate is below a second threshold value.

In another aspect, embodiments of the invention provide a motor control system configured to vary a motor speed of a DC motor. The system includes a microprocessor coupled to one or more DC motors. The microprocessor is configured to supply a pulse-width-modulated (PWM) signal to the one or more DC motors. The PWM signal provides a voltage to operate the one or more DC motors. The microprocessor is configured to measure an electric current supplied to the one or more DC motors, and also configured to measure a voltage generated by the one or more DC motors when the PWM signal is turned off. The microprocessor is also configured to determine a motor speed of the one or more DC motors based on the measured voltage, and further configured to control the motor speed to maintain a relatively constant motor speed with varying loads placed on the one or more DC motors.

The motor control system may include an analog-to-digital converter used in the measurement of the voltage generated by the one or more DC motors. In certain embodiments, the microprocessor is configured to maintain the relatively constant motor speed by controlling the PWM signal to increase the voltage to each of the one or more DC motors as the load on that DC motor increases, and to decrease the voltage to each of the one or more DC motors as the load on that DC motor decreases.

The microprocessor may be configured to measure the voltage and measure the current within three milliseconds of each other. In some embodiments, the microprocessor is configured to determine a torque of the one or more DC motors based on the measured current. The motor control system may include an electric auger motor operated by a respective PWM signal, in which the microprocessor is configured to measure a voltage generated by the electric auger motor when its respective PWM signal is turned off, configured to determine a material flow rate through the auger based on the measured voltage from the electric auger motor, and further configured to automatically activate a vibrator motor when the material flow rate is below a first threshold value. Further, the microprocessor may be configured to automatically deactivate the vibrator motor when the material flow rate is above a second threshold value. In certain embodiments of the invention, the microprocessor may be configured to automatically activate and deactivate two or more vibrator motors either simultaneously or in an alternating manner.

The microprocessor may also be configured to use GPS data to correlate a material dispersion pattern to vehicle location coordinates and/or weather patterns. The motor control system may have a lighting system, in which the microprocessor is configured to measure a voltage generated by a second DC motor when the second PWM signal to the second motor is turned off, and further configured to automatically activate the lighting system when the second DC motor is operating. In certain embodiments, the second DC motor is one of an auger motor, a spinning motor, and a wetting system motor.

In a particular embodiment, the microprocessor is configured to determine a material flow rate through an auger, having an electric motor, by measuring a voltage from the auger's electric motor when a PWM supply voltage to the electric motor is turned off, and further configured to automatically activate a wetting system if the material flow rate is above a first threshold value, and automatically deactivate the wetting system if the material flow rate is below a second threshold value.

In yet another aspect, embodiments of the invention provide a method of controlling a first DC motor of a hopper spreader. The method includes providing a pulse-width modulated (PWM) signal to operate a second DC motor, measuring a voltage generated by the second DC motor when the PWM signal is turned off, and controlling the first DC motor based on the measured voltage. The first DC motor may be one of a vibrator motor, a spinner motor, and a wetting system motor. In a particular embodiment, the second DC motor is a conveyor motor and the first DC motor is a vibrator motor.

In certain embodiments, when the measured voltage corresponds to a first load on the conveyor motor that is a below a threshold value, the vibrator motor is activated. When the measured voltage corresponds to a second load on the conveyor motor greater than the first load, the vibrator motor is deactivated. In alternate embodiments of the invention, the method includes activating two or more vibrator motors either simultaneously or in an alternating manner.

In some embodiments, the second DC motor is a conveyor motor driving a conveyor and the first DC motor is a motor running a wetting system. In this embodiment, the method includes determining a material flow rate provided by the conveyor, automatically activating the first DC motor if the material flow rate is above a first threshold value, and automatically deactivating the first DC motor if the material flow rate is below a second threshold value.

In other embodiments, the second DC motor is a conveyor motor driving a conveyor and the first DC motor is a vibrator motor running a vibrator. In this embodiment, the method includes determining a material flow rate provided by the conveyor, automatically activating the first DC motor if the material flow rate is below a first threshold value, and automatically deactivating the first DC motor if the material flow rate is above a second threshold value.

Still, in other embodiments, the second DC motor is a conveyor motor driving a conveyor and the first DC motor is a vibrator motor running a vibrator. In this embodiment, the method includes determining a load on the conveyor motor, automatically activating the first DC motor if the determined load is below a first threshold value, and automatically deactivating the first DC motor if the determined load is above a second threshold value.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
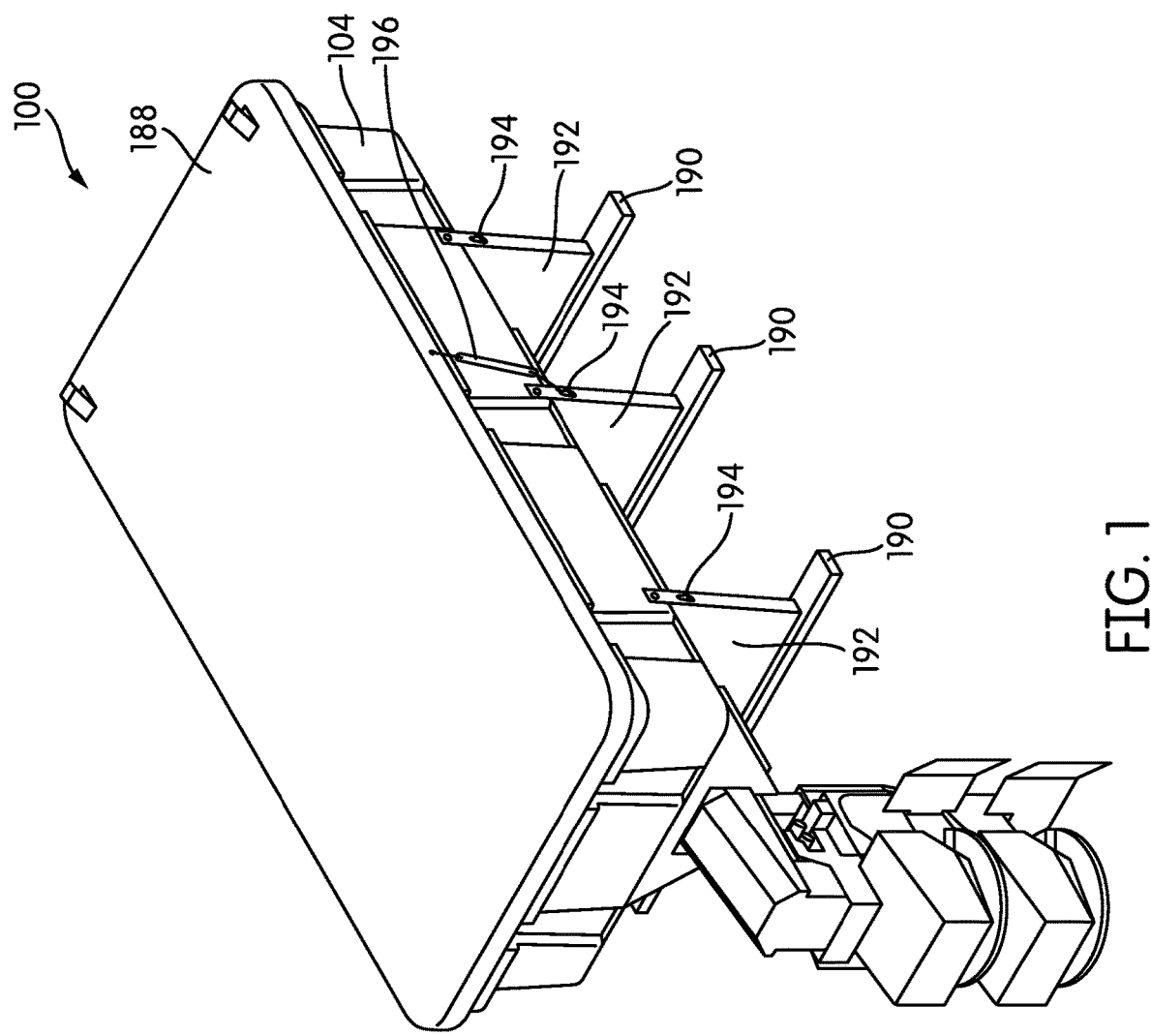
FIG. 1 is a perspective view of a spreader according to an exemplary embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring generally to FIGS. 1-5, an embodiment of a hopper spreader 100 (also referred to herein as "spread 100") is illustrated. In a particular embodiment, the spreader 100 is configured to be coupled to a vehicle, for example mounted in the bed of a truck. The spreader 100 includes a storage container such as a hopper 104 that is configured to hold material such as dry, free flow, granular or particulate material such as salt, sand, a combination of salt and sand, etc., for spreading over a surface. The spreader 100 also includes a conveyor such as a screw conveyor, drag chain or auger to move the granular material in the hopper 104 toward a chute which directs the granular material to a spinning assembly 108, which may distribute the granular material in an even and uniform flow pattern to the surface over which the vehicle travels.

In a particular embodiment, the spreader 100 uses a combination of the hopper 104, an auger 110, an isolated vibrating inverted V-shaped baffle 112, an inverted V-baffle adjustment mechanism, an internal suppression baffle, and an internal directional flow baffles, to transfer spreading media from the hopper 104 to the spinning assembly 108 and then to the surfaces below in an even and uniform flow pattern. Embodiments of the spreader 100 use a conveyor instead of an auger to move the spreading media. In a particular embodiment, the structure of the spreader 100 may be enhanced with horizontally established rings that encircle the hopper structure forming a band structure that gives the hopper 104 vertical and horizontal structure, which may keep the walls of the hopper 104 from bulging and failing under loaded conditions. Additionally the upper structure may be reinforced with metal support structures that act as tension members to hold the upper hopper in position, while at the same time acting as a support structure for the grid and a support structure for the hold down structures (i.e. brackets that straps use to attach the spreader 100 to the bed of a truck). In yet another embodiment, the spreader 100 may be prevented from moving from side to side in the bed of a truck by the addition of side support boards that can be easily integrated into the lower support structure.

To prevent the spreading media from being contaminated during transport, in one embodiment, a cover 102 may be mounted on the hopper structure and stretched to conform to the upper hopper lip. Tubular structure inside the cover prevents the cover from coming off the hopper 104, while acting as a handle to remove and then roll back the cover for stowage. A series of straps and clamps may be used to loop into the grid structure and bind the cover to the spreader 100 for transport when rolled up. With reference to FIG. 1, an embodiment of a spreader 100 is illustrated. The spreader 100 is configured to be coupled to a vehicle, typically in the bed of a pickup truck.

The spreader 100 may include a plurality of leg supports 190 under the spreader 100 which extend generally laterally with respect to the longitudinal axis of the auger 110 (not visible in FIG. 1). The spreader 100 also includes a plurality of legs 192 extending upwardly from the leg supports 190 to the hopper 104 and providing support for the hopper 104 against outwardly directed forces, buckling forces, etc. Located in the outer surface of the legs 192 are hook retention slots 194. A shock strap 196 coupled to a tarp 188 has an end hook that may engage the retention slot 194 to couple the tarp 188 to the hopper 104.

Figure 2:
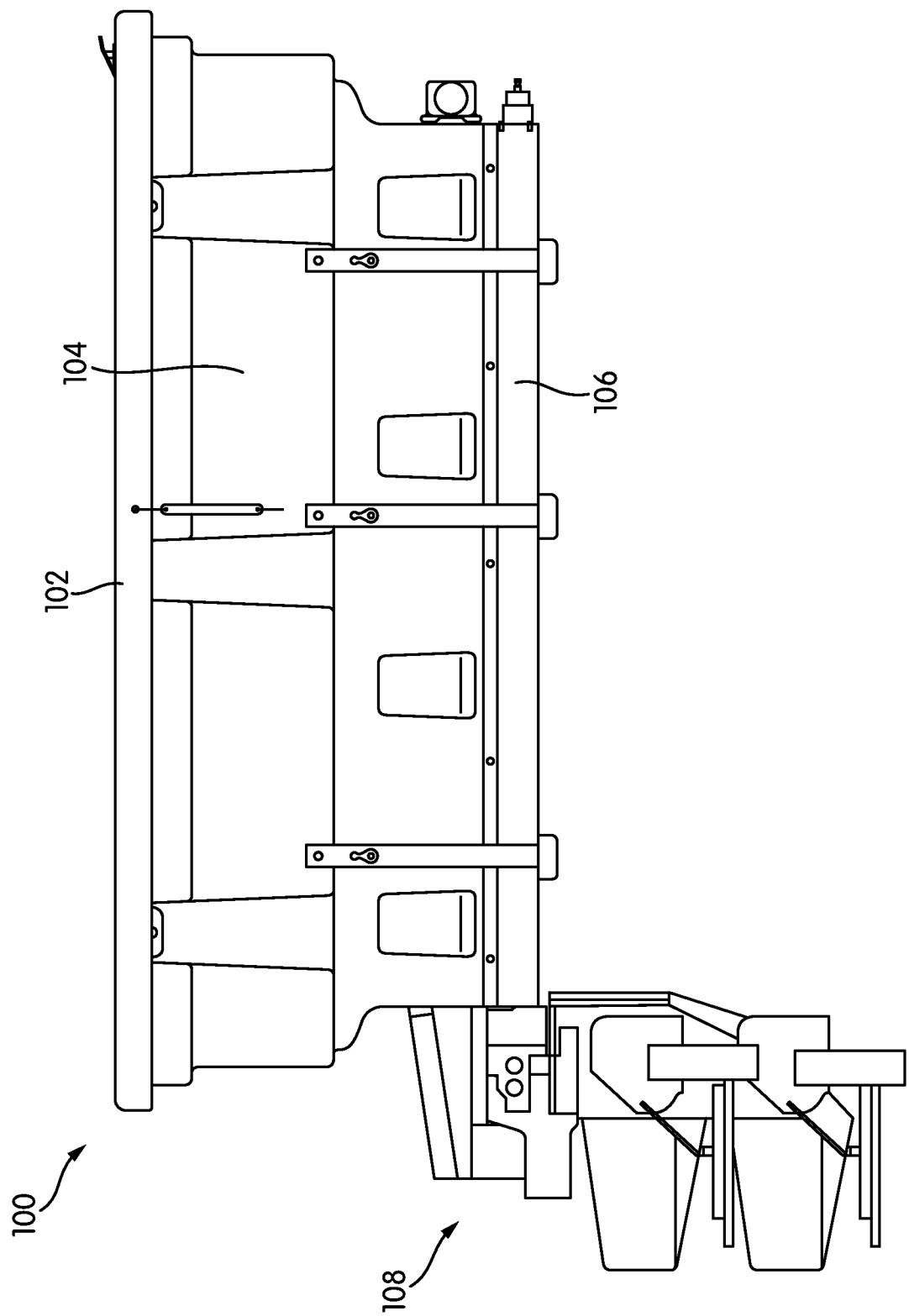
FIG. 2 is a side view of the spreader according to an exemplary embodiment of the invention.

FIG. 2 illustrates a side view of an embodiment of a spreader 100. The spreader 100 includes a cover 102 configured to cover and prevent contamination of the contents of a storage hopper 104. Extending along the longitudinal axis and closing the lower end of the hopper 104 is a lower portion acting as a closure and referred to herein as a trough 106. The hopper 104 and the trough 106 together define a container in which the hopper 104 is an upper portion thereof and the trough 106 is a lower portion thereof. The hopper 104 includes a sidewall extending from a first end configured to be closed by the cover and a second end closed by the trough 106. At one end, the trough 106 defines a dispensing aperture configured to release the contents of the hopper 104 to the spinning assembly 108. The spinning assembly 108 includes a spinner motor which drives a spinner located at the back of the spreader 100 for receiving particulate material discharged from the hopper 104 and spreading the particulate material over a distribution area.

Figure 3:
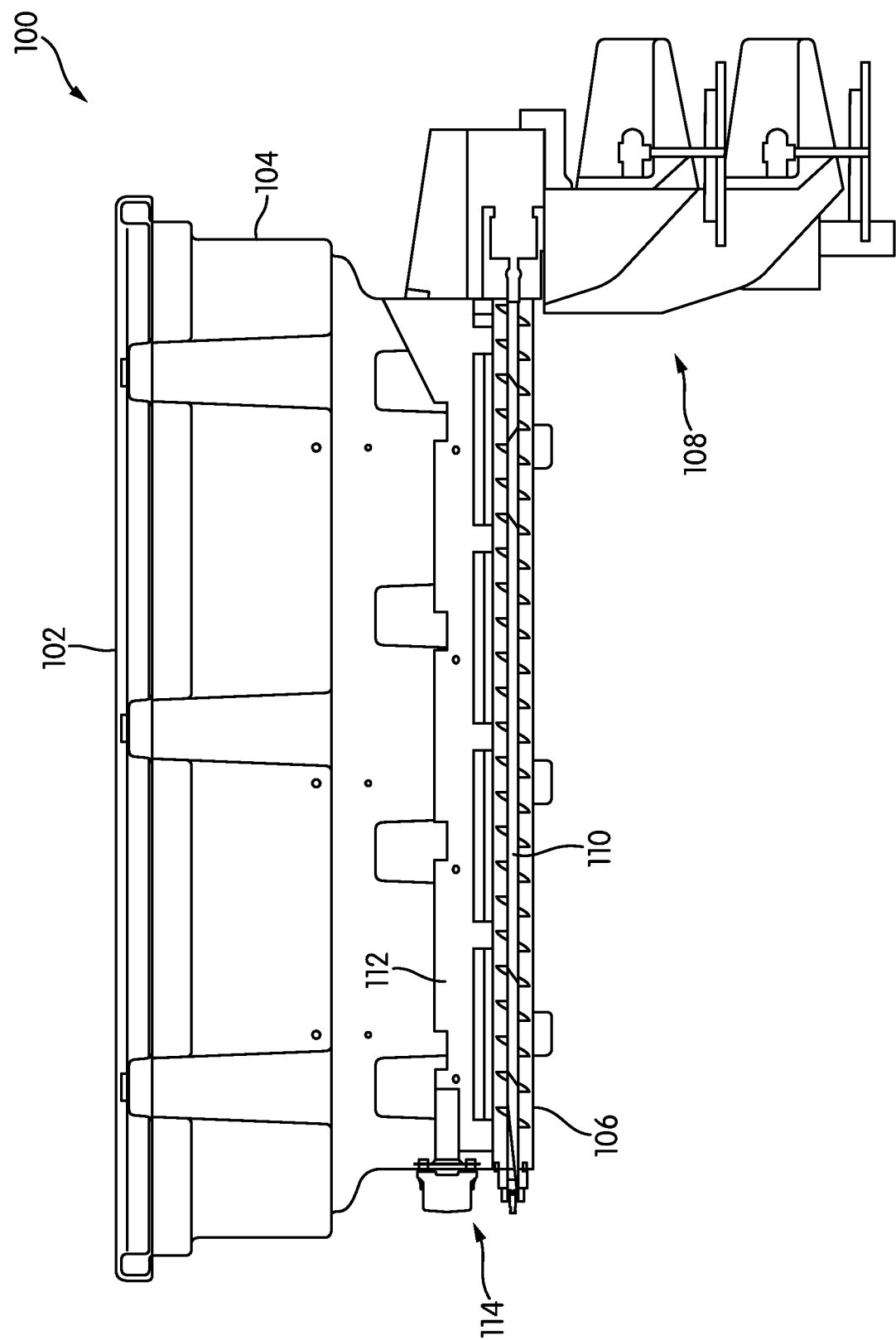
FIG. 3 is a cross-sectional view of the spreader according to an exemplary embodiment of the invention.

FIG. 3 is a cross-sectional view of an embodiment of the spreader 100. The spreader 100 includes a motor-driven conveyor, shown as an auger 110, extending along the longitudinal axis of the trough 106. In other embodiments, other suitable types of conveyors such as screw conveyors, drag chains, etc., may be used. The spreader 100 also includes a vibration transfer member, shown as a generally inverted V-shaped baffle 112 extending along the longitudinal axis of the hopper 104 above the auger 110. The V-shaped baffle 112 functions to prevent the weight of all of the particulate material in the hopper 104 from jamming the auger 110. The spreader 100 also includes a vibrator assembly 114 configured to vibrate as will be further described below. In other embodiments, the vibrator assembly 114 may be configured to vibrate the hopper 104 and/or the trough 106 instead of the inverted V-shaped baffle 112. Further, the vibrator assembly 114 may be located on a side of the hopper 104 rather than an end as illustrated in FIG. 3.

Figure 4:
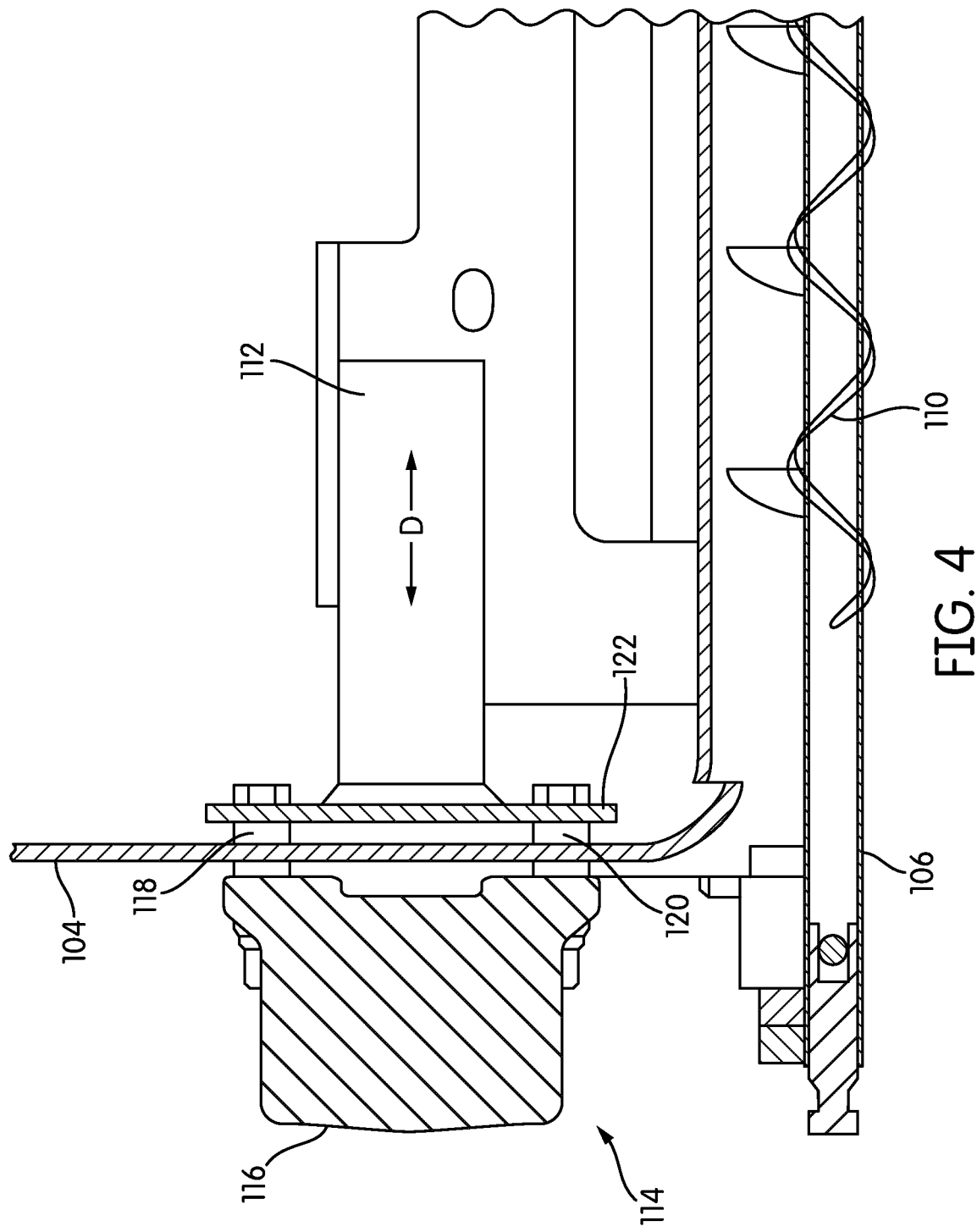
FIG. 4 is an illustration of a vibrator, hopper wall, inverted-v baffle, and auger shown schematically according to an exemplary embodiment of the invention.

FIG. 4 is a detailed cross-sectional view of an embodiment of the spreader 100 including the vibrator assembly 114 and the inverted V-shaped baffle 112. A vibrator 116 is coupled to the inverted V-shaped baffle 112 by four spacers, two of which are shown in FIG. 4 as upper isolation spacer 118 and lower isolation spacer 120. The spacers 118 and 120 pass through the wall of the hopper 104 and are coupled to an end plate 122 of the inverted V-shaped baffle 112 and support one end of the V-shaped baffle 112. In one embodiment, the isolation spacers 118 and 120 may promote vibration transfer to the inverted V-shaped baffle 112 and deter vibration transfer to the hopper 104.

Figure 5:
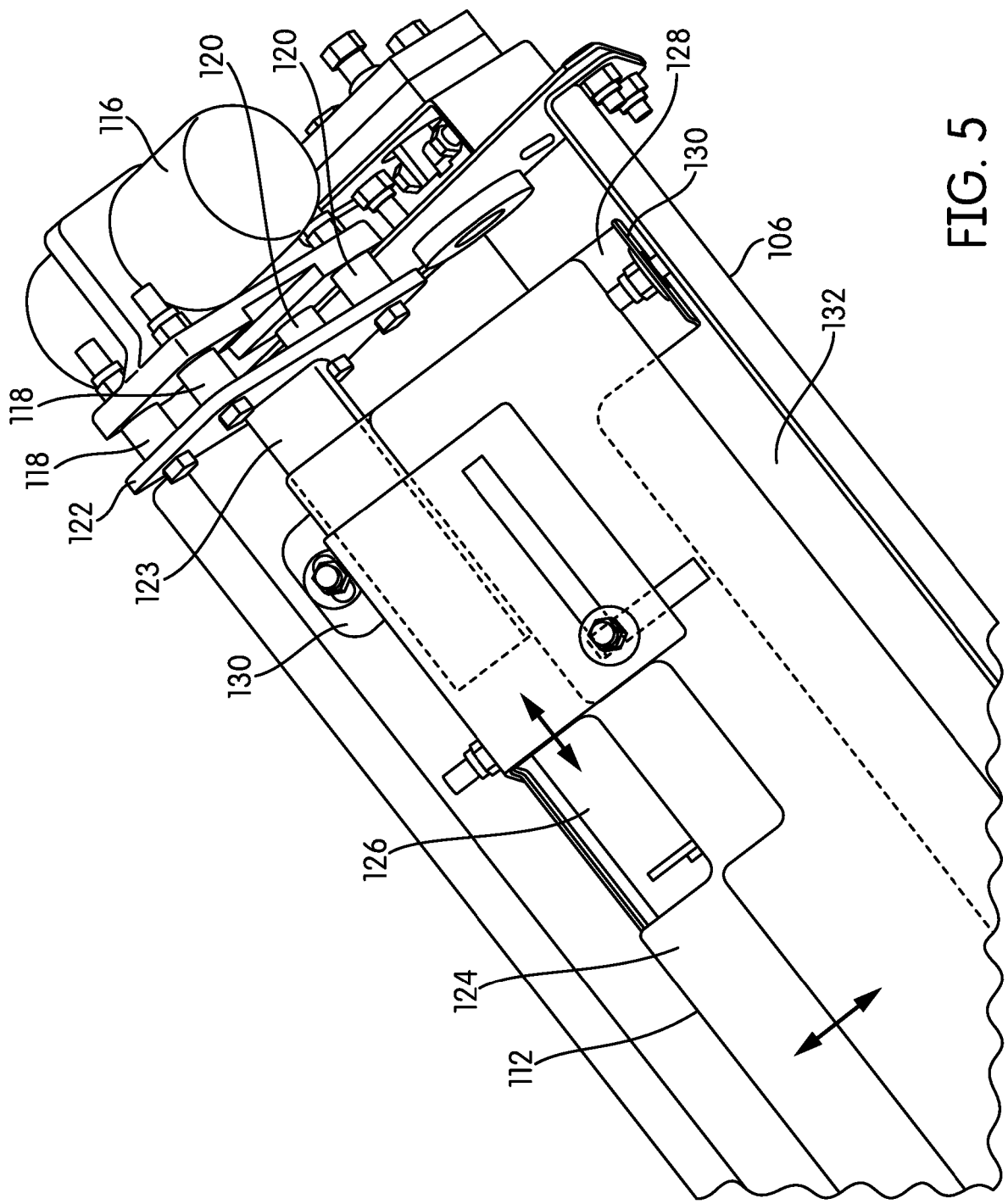
FIG. 5 is an illustration of the spreader with the hopper removed for illustrative purposes according to an exemplary embodiment of the invention.

With reference to FIG. 5, a tube structure shown as a transition portion 123 extends from the end plate 122 below the inverted V-shaped baffle 112 and supports the inverted V-shaped baffle 112. In one embodiment, the transition portion 123 is coupled to the inverted V-shaped baffle 112, such as, for example, by welding. In another embodiment, the transition portion 123 is configured to transfer load through a large area of the inverted V-shaped baffle 112, instead of the end of the V-shaped baffle 112 being welded directly to the end plate 122.

In the embodiment shown, the transition portion 123 extends from the end plate 122 to a central V-plate 124. The central V-plate 124 defines a plurality of upper apertures 126 spaced apart along the length of the central V-plate 124. The central V-plate 124 includes a plurality of support legs 128 longitudinally offset from the upper apertures 126 and extending from each side. Further, the central V-plate 124 defines outer passages 132 between the support legs 128 configured to allow passage of particulate material between the central V-plate 124 and the hopper 104.

With further reference to FIG. 5, in one embodiment, the vibrator 116 may be configured to vibrate the V-shaped baffle 112 back and forth in a direction D (see FIG. 4) generally along the longitudinal axis of the hopper 104, for example generally parallel to the longitudinal axis of the auger 110. Thus, the vibrator 116 and the inverted V-shaped baffle 112 are isolated from the hopper 104 in the direction of movement of the inverted V-shaped baffle 112. In one embodiment, the inverted V-shaped baffle 112 is allowed to slide horizontally, for example, back and forth in the direction D, relative to the hopper 104 to facilitate maximum vibration effects from the vibrator 116.

In another embodiment, the vibrator 116 may be coupled to the hopper 104 and not directly connected to the inverted V-shaped baffle 112. In still another embodiment, the vibrator 116 may be coupled to the trough 106 and not directly connected to the inverted V-shaped baffle 112. In still another embodiment, multiple vibrators may be provided to provide additional vibration at different locations within the hopper 104 or trough 106. In one embodiment, the opposite end of the inverted V-shaped baffle 112 proximate the discharge opening of the hopper 104 may be supported by extensions or support legs 128 with upturned ends 130 coupled, for example, by being bolted to the hopper 104.

In one embodiment, the vibrator 116 may be a rotational offset weight vibrator. In another embodiment, the vibrator 116 may be an electric vibrator. In still another embodiment, the vibrator 116 may be a hydraulic vibrator. In yet another embodiment, the vibrator 116 may be a pneumatic vibrator. In another embodiment, the vibrator 116 may be a vertical type vibrator. In yet another embodiment, the vibrator 116 may be an oscillating vibrator. In still other embodiments, other suitable types of vibrators may be used.

Typically, in V-box spreaders and tail gate spreaders, the need for varying motor speeds is essential for optimum material spreading capabilities. The motors that are regulated in speed range from spinner motors, auger motors, drum drives, drag chain drives and wetting systems drives. All these motors, when varied in speed, maximize profits for the customer, while maintaining conservation of material usage and optimizing material effectiveness against ice and snow.

The main issue however with varying speed on motors is that they typically lose performance when throttled back or run at low speeds. This has to do with the way the motor speed is regulated in conventional systems. The net effect is that conventional systems typically cannot utilize the full motor speed or rpm range of the spreader, and are therefore limited in what the spreader can do, especially at low rpm settings. It is not uncommon for users of these conventional systems to run the spreader at full speed at all times primarily because of the control system limitations.

In particular embodiments of the invention described below, a motor control system regulates the motor speed, or rpm level, to be constant regardless of the load place on the motor. In other words, the motor control system functions somewhat like the automatic cruise control system in an automobile. When the car is driving down a normal level highway, the engine maintains a uniform rpm and constant speed. When the car encounters a hill, the output of the engine will not be sufficient enough to keep the speed at the desired level, so the throttle is automatically depressed, causing the output of the motor to match the hill climbing loads and therefore maintain the speed that was set. Inversely, when the car goes down a hill, the throttle is closed in order to reduce the engine output, when it is not needed, to keep the speed from increasing beyond the desired level.

Variations in the loading of the motors in a hopper spreader require that the power supplied to these motor be adjusted in accordance with the load variation. In particular, the flow of material controlled by the hopper 104 via the motor driven conveyor, e.g. auger 110, varies as material is dispensed from the hopper 104. For instance, if the material bridges within the hopper 104, loading of the conveyor will decrease such that less power is required to run it at a constant speed. Similarly, when the bridged material collapses and rushes onto the conveyor, increased power is required to maintain a constant conveyor speed.

Figure 6:
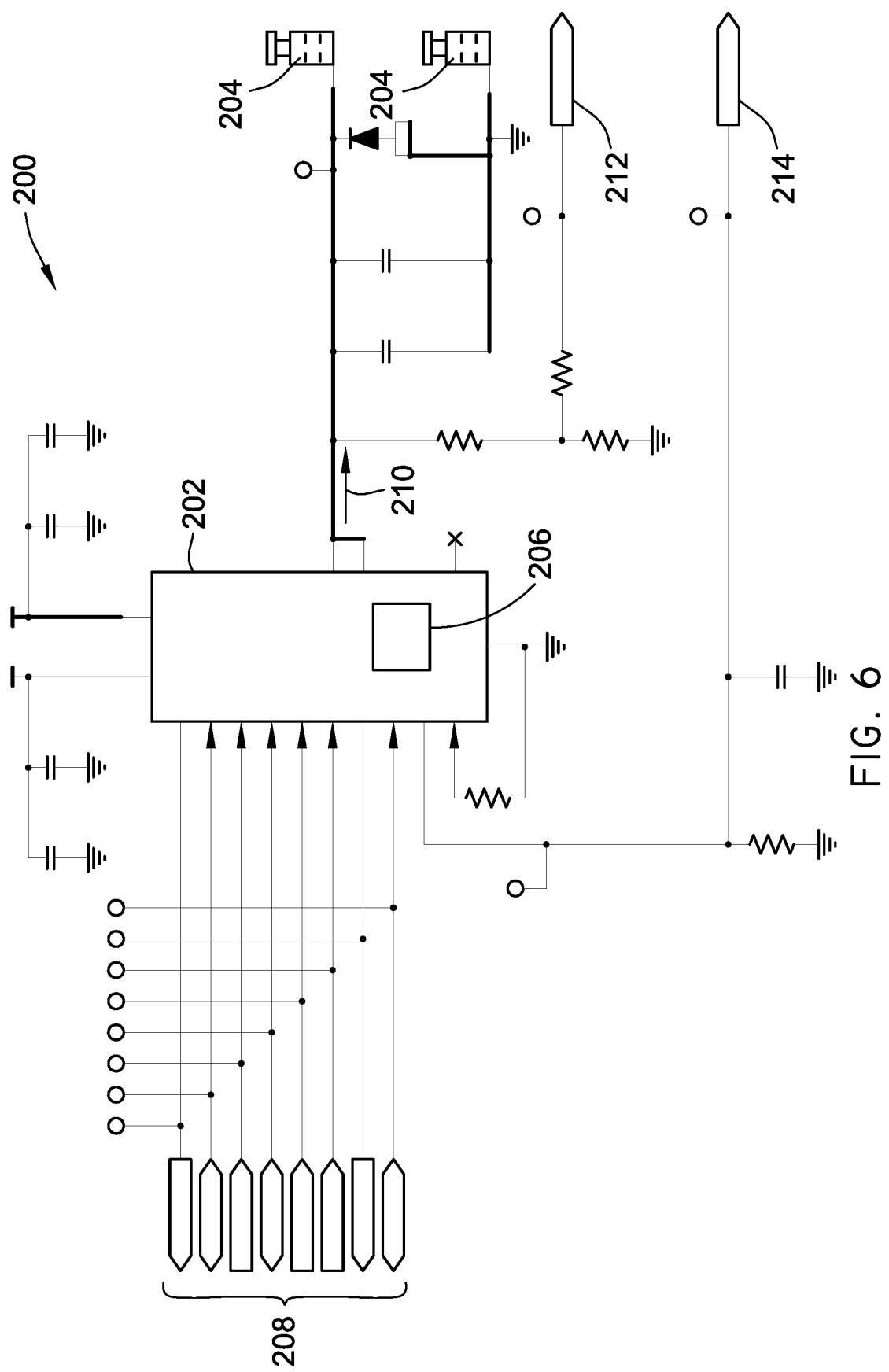
FIG. 6 is a schematic diagram of the electronic circuit for operation and control of the spreader shown in FIGS. 1-5.

FIG. 6 is a schematic diagram of the electronic circuit 200 for operation and control of the spreader 100 described above and shown in FIGS. 1-5. The electronic circuit 200 includes a microprocessor 202 coupled to one or more DC motors 204, such as spinner motors or conveyor motors. One common method for varying the speed of the one or more DC motors 204 is to vary the voltage supplied to the DC motors 204. This supply voltage typically ranges from 3 volts to 12 volts on the motor speed setting scale. However, in particular embodiments of the invention, the voltage of the signal to the DC motors 204 may average anywhere from 0 to 12 volts direct current (Vdc). Embodiments of the invention include 24-volt systems in which the voltage of the signal to the DC motors 204 may average anywhere from 0 to 24 Vdc. This is typically accomplished by pulse-width modulation (PWM) using, for example, some type of computer control. With respect to the aforementioned spreader systems, the DC motor 204 may be one of, though not limited to, a spinner motor, an auger motor, a conveyor motor, and a wetting system motor.

PWM essentially involves turning a switch on and off very quickly in order to quickly turn a supply voltage on and off. When this occurs, the supply voltage typically varies between full voltage (e.g., 12 volts) when the switch is on, and zero volts when the switch is off. Because the rotational speed of the one or more DC motors 204 is proportional to the voltage supplied, the motor speed or rpm level will be regulated as the PWM signal is correspondingly regulated up or down. The PWM signal meters voltage to the one or more DC motors 204 and therefore affects the motor speed or rpm.

In certain embodiments, the microprocessor 202 is used to measure the voltage generated by the one or more DC motors 204 when the pulse-width modulation (PWM) signal is turned off. Following measurement of this analog voltage, an integrated analog-to-digital converter 206 in the microprocessor 202 generates a value that is proportional to the voltage. The PWM signal that operates the one or more DC motors 204 is provided at input 208 to the microprocessor 202. The microprocessor 202 provides an output voltage 210 to each of the one or more DC motors 204. This output voltage 210 is designed to operate the one or more DC motors 204 at a desired motor speed, or rpm level.

The electronic circuit 200, as disclosed herein, allows the motor control system to utilize the full power band of the one or more DC motors 204 at all motor speeds, i.e., at all rpm levels. This is accomplished by tracking the speed, or rpm level, of the one or more DC motors 204 by counting the generator output (also referred to herein as the "back EMF") of the respective DC motors when the motors are off. As will be explained below, "EMF" stands for electromotive force, which may be generated by the collapse of a magnetic field. In conventional control systems, motor speed tracking is accomplished using encoders, switches and other sensor equipment. The system being disclosed in this application utilizes the motors generator feedback as a counting source.

Whenever one of the DC motors 204 is activated by output voltage 210, the commutator enlivens the motor's rotor coil. This coil, in turn, generates a magnetic field which then is used to rotate the DC motor 204. Once the magnetic field has served its purpose, it is shut off or, more specifically, the PWM signal can be turned off leading to the collapse of the magnetic field. The shutting off of the supply voltage then allows the DC motor 204 to function in its generator capacity, because when the output voltage 210 to the DC motor 204 is shut off, the magnetic field collapses back through the coil generating electricity. This back EMF pulse, created by the DC motor 204, can be measured and counted.

As stated, the magnetic field in the DC motor 204 collapses when the power is removed. During that time, the DC motor 204 continues to rotate, and, therefore, acts like a generator producing a voltage that is proportional to its rotational speed. In typical embodiments, the PWM signal frequency is about 120 Hz±5 Hz. That is, the PWM signal is switched on and off about 120 times per second. If the on time is the same as the off time, then the DC motor 204 sees an average supply voltage of about 6 volts and therefore rotates at a slower speed. As referenced above, by using PWM signals, it is possible to deliver the full voltage range from 0 to 12 volts for speed control. As the load on the DC motor 204 increases, the motor speed will slow, which can be sensed by a corresponding reduction in back EMF pulses. By increasing the on-time of the PWM signal relative to its off-time, more voltage is supplied to increase the power delivered to the DC motor 204. This may be done in order to achieve the desired motor speed, and, as a result, the corresponding back electromotive force (EMF) will be increased as well.

Referring again to FIG. 6, circuit location 212 is the input control from the microprocessor 202 where the voltage measurement of the aforementioned back EMF pulse is taken. Because the back EMF pulse is generated when the PWM signal is off, the voltage measurement also occurs when the PWM signal is off. Circuit location 214 is the analog current measurement point for the current flowing into the one or more DC motors 204. This current measurement can be used to determine a torque produced by the one or more DC motors 204. In a particular embodiment, current to the one or more DC motors 204 is sampled when the PWM signal is turned off, and the voltage of the back EMF pulse is sampled about 2.5 milliseconds later, or more broadly within three milliseconds or the current sampling.

In a particular embodiment, the current is sampled just at the point when the PWM is turned off (see pulse 224 in FIG. 9) to provide protection to the DC motor 204 should the current threshold be exceeded. At this point, if the current threshold is exceeded, the microprocessor 202 will reduce the PWM voltage to maintain the current below the desired maximum allowable current for each DC motor 204 in the system. In alternate embodiments of the invention, the time frame between current and voltage measurements could be more or less than three milliseconds. Generally, the time frame chosen is related to the PWM signal frequency. The 3-millisecond time frame is suitable for PWM signals of about 120 Hz. Higher frequencies might necessitate a time frame for current and voltage measurements that is less than three milliseconds, while lower frequencies might necessitate a time frame that is greater than three milliseconds.

As stated above, conventional motor speed tracking is typically accomplished using encoders, switches and other sensor equipment. With conventional motor control systems, one unfortunate side effect of reducing the speed of the motor is that the torque simultaneously drops as well. Torque is generated in an electric motor by the amount of amperage that the windings see at a given moment. The torque of the motor using a voltage-speed adjustment varies essentially from zero to the stall torque. The lowest torque value is seen at zero rpm, and the highest torque value is seen at the motor's full speed.

In an exemplary embodiment, the motor control system may include an electric auger motor operated by a respective PWM signal, in which the microprocessor 202 is configured to measure a voltage generated by the electric auger motor when its respective PWM signal is turned off, and also configured to determine a material flow rate through the auger based on the measured voltage from the electric auger motor. The microprocessor 202 may also be configured to automatically activate a vibrator motor, for example, when the material flow rate is below a first threshold value. Further, the microprocessor 202 may be configured to automatically deactivate the vibrator motor when the material flow rate is above a second threshold value. In other embodiments of the invention, the microprocessor 202 may be configured to automatically activate and deactivate two or more vibrator motors either simultaneously or in an alternating manner Operation of the two or more vibrator motors could also be preset to automatically turn on and off at predefined times based, for example, on the type of material being dispensed.

Broadly speaking, embodiments of the invention include a system and method of controlling a first DC motor 204 of a hopper spreader. A pulse-width modulated (PWM) signal operates a second DC motor 204. The voltage generated by the second DC motor 204 when the PWM signal is turned off, is used to control the first DC motor 204 based on a measurement of the generated voltage. The first DC motor 204 may be one of a vibrator motor, a spinner motor, and a wetting system motor. In a particular embodiment, the second DC motor 204 is a conveyor motor and the first DC motor 204 is a vibrator motor.

In certain embodiments, when the measured voltage corresponds to a first load on the conveyor motor that is a below a threshold value, the vibrator motor is activated by the microprocessor 202. When the measured voltage corresponds to a second load on the conveyor motor greater than the first load, the vibrator motor is deactivated by the microprocessor 202. In alternate embodiments of the invention, the system includes two or more vibrator motors, which can be activated either simultaneously or in an alternating manner.

In an exemplary embodiment, the second DC motor 204 is a conveyor motor driving a conveyor, and the first DC motor 204 is a motor running a wetting system. In this embodiment, the material flow rate provided by the conveyor is determined. Based on this determination of the flow rate, the first DC motor 204 is automatically activated if the material flow rate is above a first threshold value, and automatically deactivated if the material flow rate is below a second threshold value.

In other embodiments, the second DC motor 204 is a conveyor motor driving a conveyor and the first DC motor 204 is a vibrator motor running a vibrator. In this embodiment, the material flow rate provided by the conveyor is determined. Based on this determination of the flow rate, the first DC motor 204 is automatically activated if the material flow rate is below a first threshold value, and automatically deactivated if the material flow rate is above a second threshold value.

Figure 7:
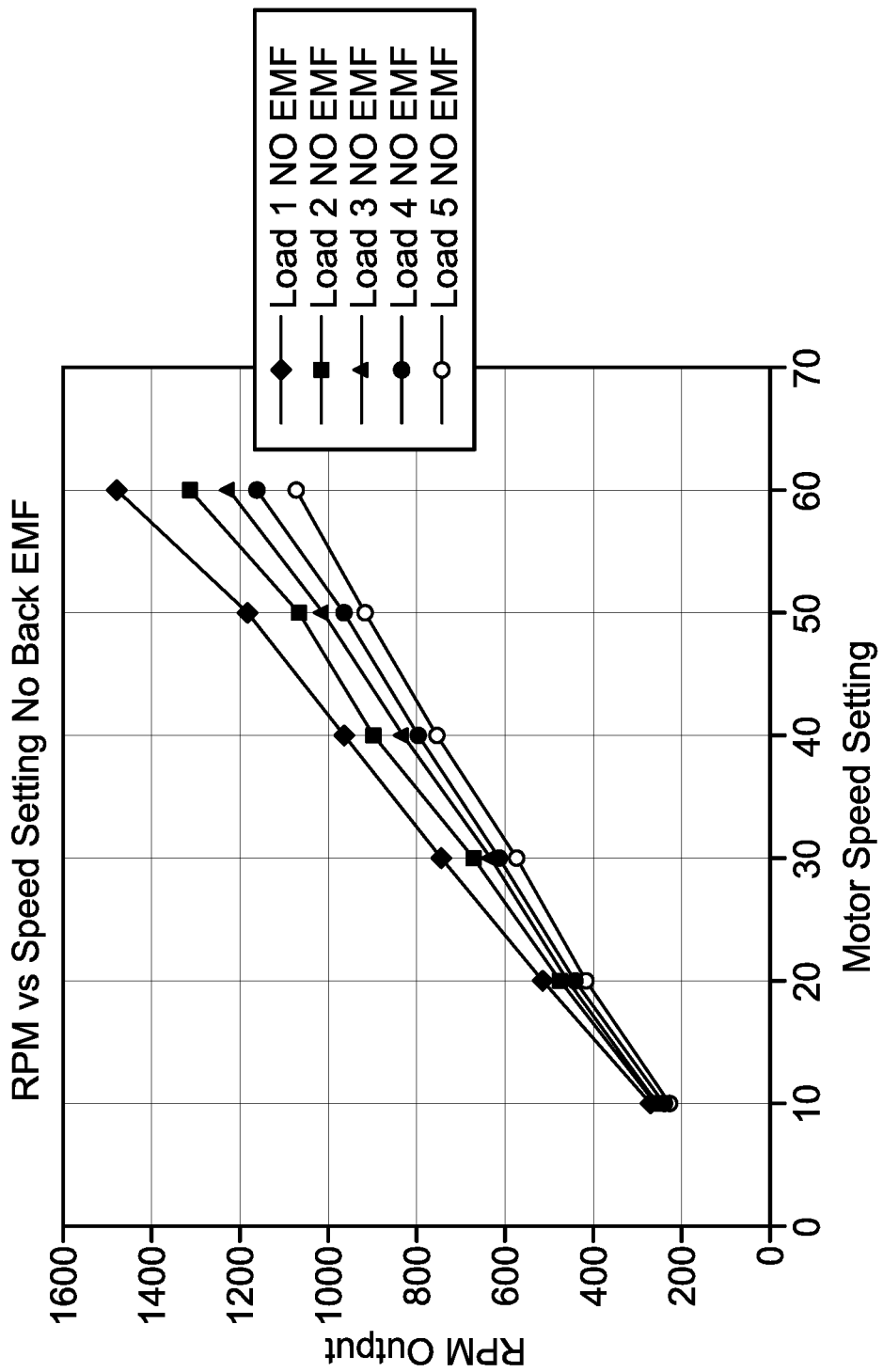
FIG. 7 is a graphical illustration showing RPM Output on the vertical axis versus the Motor Speed Setting on the horizontal axis for a conventional motor control system.

Still, in other embodiments, the second DC motor 204 is a conveyor motor driving a conveyor and the first DC motor 204 is a vibrator motor running a vibrator. In this embodiment, the load on the conveyor motor is determined. The first DC motor 204 is automatically activated if the determined load is below a first threshold value, and automatically deactivated if the determined load is above a second threshold value FIG. 7 is a graphical illustration which shows how electric motors in conventional systems tend to slow down depending on the amount of the load placed on the motor. The graph of FIG. 7 shows motor speed as RPM Output on the vertical axis versus the Motor Speed Setting on the horizontal axis. Speed curves for five different loads are depicted in the graph. Throughout almost all of their ranges, each of the five speed curves shows a different RPM level for any given speed setting. Thus, if the motor being sensed is the conveyor motor, different rates of material are being dispensed for different loads at a given speed setting. For example, material is being dispensed faster for load 1 (with no EMF sensing) at speed setting 50 as compared to load 5 (with no EMF sensing) because the motor's RPM's are different even though a same speed setting is used.

Figure 8:
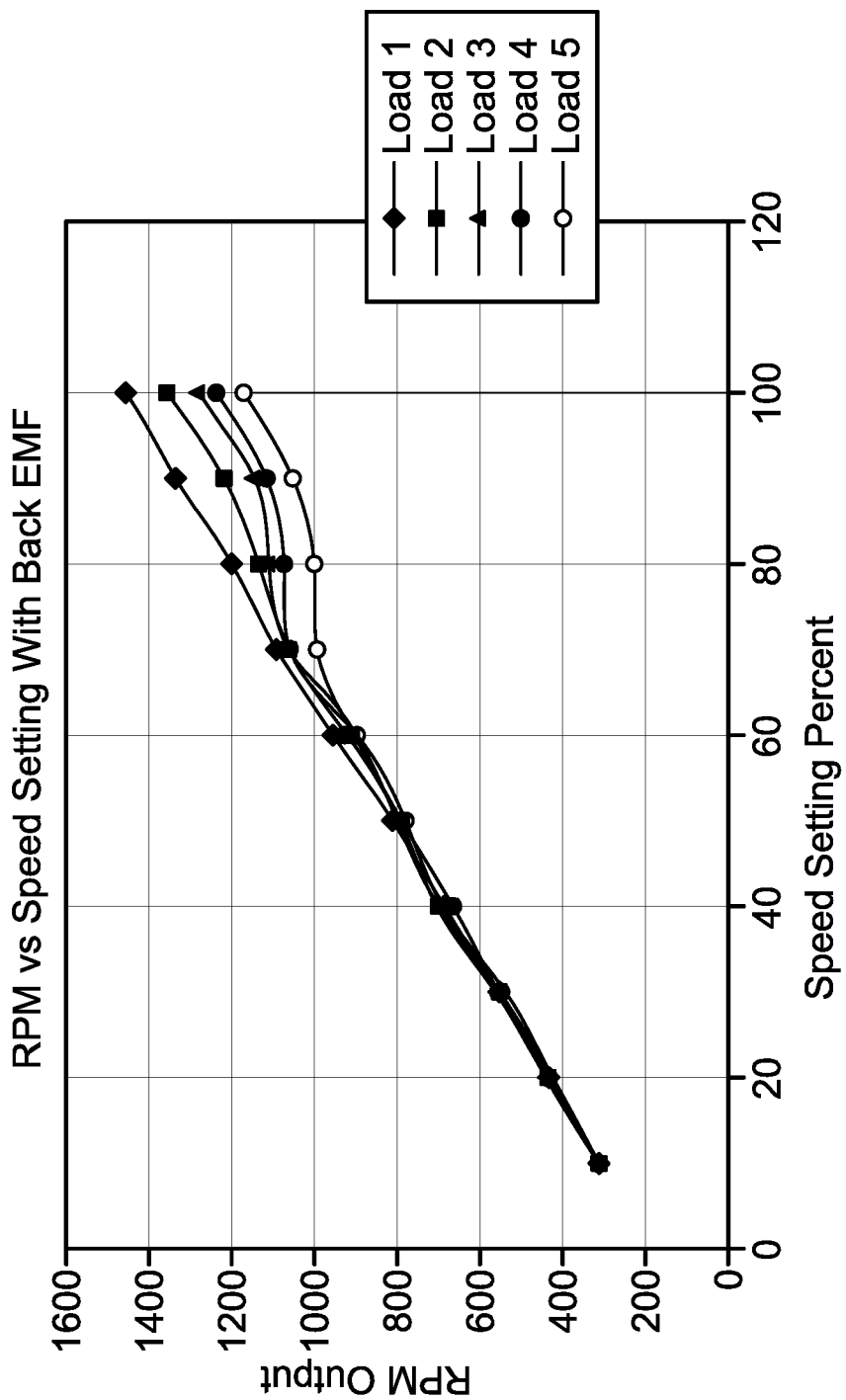
FIG. 8 is a graphical illustration showing RPM Output on the vertical axis versus the Motor Speed Setting on the horizontal axis for a motor control system constructed in accordance with an embodiment of the invention.

As explained above, the system being proposed herein utilizes the motor's generator feedback as a counting source to determine the motor's RPM. In particular embodiments of the invention, the motor control system regulates the motor speed, or rpm level, to be constant regardless of the load. FIG. 8 is a graphical illustration which shows how the motor control system disclosed herein avoids the problem described above with respect to the graph of FIG. 7.

In some ways, the motor control system of the present invention is somewhat like the automatic cruise control system in an automobile. When the car is driving down a normal level highway, the engine maintains a uniform motor speed, or rpm level. When the car encounters a hill, the output of the engine will not be sufficient enough to keep the speed up, so the throttle is automatically depressed, increasing the output of the motor in order to handle the additional load placed on the engine by the hill, and to maintain the vehicle's speed at the setpoint. Inversely, when the car goes down a hill, the throttle is closed or partially closed in order to reduce motor output so that vehicle speed does not increase beyond the setpoint on the downhill terrain.

As a result, the profile of the motor (such as DC motor 204), illustrated in FIG. 8, changes from being one of multiple, separately-spaced speed lines, as shown in FIG. 7, substantially to one single speed line throughout most of its range, because, in embodiments of the present invention, the motor control system supplies the right amount of voltage to keep the electric motor running at a constant motor speed for the given speed setting regardless of the load applied. The graphical illustration of FIG. 8 demonstrates how the use of back EMF works to ensure that the same loads 1 thru 5, as depicted in FIG. 7, may be placed on the electric motor controlled by a motor control system with electronic circuit 200, in order to yield the Speed Setting vs. RPM Output profile shown in FIG. 8. It is noted that once the motor hits a maximum power level, back EMF no longer allows for increased power and thus the lines start to separate as more power cannot be provided by the motor to increase the RPM.

Figure 9:
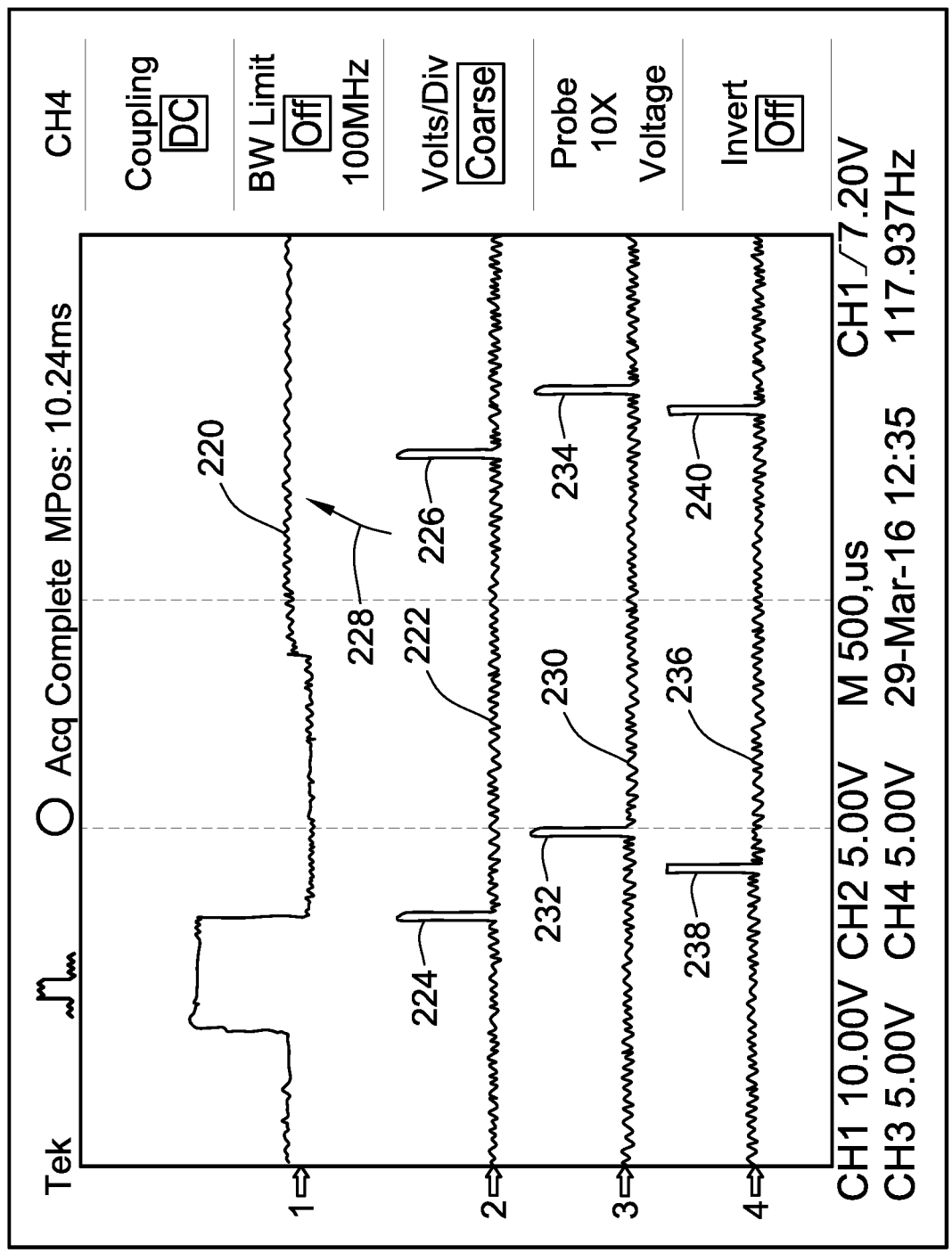
FIG. 9 is a graphical illustration showing various signal traces produced by the motor control system, in accordance with an embodiment of the invention.

FIG. 9 is a graphical illustration showing various signal traces produced by the claimed invention. A first trace 220 shows the PWM control signal and voltage to the one or more DC motors 204. A second trace 222 includes a first pulse 224 which shows when the analog-to-digital converter 206 samples the current going to the auger motor. A second pulse 226 shows when the analog-to-digital converter 206 (shown in FIG. 6) samples the voltage (shown by arrow 228) generated by the auger motor when the PWM signal is off. Typically, conventional systems do not use a microprocessor to provide the precise timing needed to sample the back EMF measurement synchronized to the PWM signal. A third trace 230 has a first pulse 232, which shows the sample-timing for the current to the spinner motor, and a second pulse 234, shows the sampling of the voltage generated by the spinner motor when the PWM signal is off. Similarly, fourth trace 236 has first and second pulses 238, 240 showing the timing of current sampling and voltage measurement for the drum motor.

An electric motor can have a large amount of torque (essentially stall torque) when at zero rpm, especially if full voltage is applied in a controlled manner, so that the motor does not run away, when the load is released. This control system utilized the full torque potential at all motor speeds, or all rpms, whereas conventional controls are limited to full power only being available at the full speed setting. This control enables full torque to be available at zero thru full rpm on a DC electric motor.

It will be recognized by those of ordinary skill in the art that there are applications for the motor control system disclosed herein other than that described above. For example, with respect to automatic vibrator control, there are various methods for monitoring the material and hopper conditions. These methods include, but are not limited to, material level/height sensing, weight sensing, flow sensing (i.e., rotating flow meter, motor load sensing, rpm sensing on auger or drag chain). The turning "on" and "off" of the vibrator 116 (shown in FIG. 4) can be predetermined and turned on using an algorithm programmed into the microprocessor 202 (shown in FIG. 6), or turned on using a timer, or set limit devices (i.e., material level sense: material is below sensor).

In a particular embodiment of the invention, the microprocessor 202 is configured to automatically turn "on" and "off" the vibrator 116 (shown in FIGS. 3 and 4) based on a material flow rate through the auger 110. This feature enhances the system's ability to provide optimum spreader performance. This feature also serves to prevent the spreader 100 (shown in FIG. 1) from jamming up, and thus maximizes the spreader pattern so there is no disruption in material dispersion.

In an embodiment of the invention, a method for automatically turning the vibrator 116 "on" and "off" utilizes load-sensing on the auger 110 (see FIGS. 3 and 4), where the auger 110 is intended to engage the material and either meets or does not meet the expected amount of resistance from material flow through the auger 110. In a particular embodiment, the load-sensing on the auger 110 is determined by the back EMF pulse received from the auger motor. As explained above, the back EMF, generated by a DC motor when the PWM signal is off, may be used to determine the motor speed or rpm level of the motor. The rpm level may indicate how much resistance the auger 110 is seeing. A small amount of resistance may correlate to a bridged condition, in which the flow of material to the auger is restricted. In an embodiment of the invention, when the back-EMF-based load-sensing apparatus indicates resistance below a first threshold level, the vibrator 116 automatically turns on. Turning on the vibrator 116 deluges the auger 110 with granular material causing the overall load draw on the auger 110 to increase. As the auger 110 approaches a point where the material could overwhelm and possibly jam the auger 110 solid, the vibrator 116 automatically shuts off. Thus, in this embodiment, when the back-EMF-based load-sensing apparatus indicates resistance above a second threshold level, the vibrator 116 automatically turns off.

This cycle is repeated such that, the auger 110 manages the granular material until the auger motor resistance, as indicated by its back EMF, is small enough that the vibrator 116 should be turned on again. This cycle or loop continues indefinitely until the material is completely dispensed out of the unit, at which time the auger 110 will meet little resistance. If the limited amount of resistance is sensed for an extended period of time, the auger can be automatically turned off. The end user may also be notified automatically that the material bin is empty.

Additionally, in certain embodiments, when the auger 110 or the spinner become jammed, the vibrators 116 are turned off automatically to prevent the auger from becoming further packed full of material or over-packing the material itself. Also if the spinner is jammed, the auger 110 shuts off automatically, and this by default shuts off the vibrators 116 when the auger 110 is not running. This prevents the auger 110 from being jammed full of material and also prevents the auger 110 from dumping more material on the spinner when it is already overwhelmed.

A GPS monitor can relate also vehicle speed to auger-spinner-wetting speed to optimize material spread/saturation/density over the desired work area. Additionally, the GPS system can relate weather conditions to the spreader system optimizing the material output for pavement conditions. The ability to use GPS data to correlate the material dispersion patterns to the location coordinates entered allows for the automatic adjustment of granular material dispersion based on the vehicle location and environment. As such, this feature is a desired element for an automatic material dispensing function. Additionally, this GPS feature is useful for monitoring and recording whether the dispensing has been performed, the date and time the dispensing have been performed, the length of time performed, and whether the correct quantities were dispersed.

In a particular embodiment of the invention, when the spreader 100 encounters a jam condition with either the auger 110 or the spinner system, the wetting system automatically shut off. The wetting system dispenses wetting materials onto the spreading medium and in doing so saturates the material at a given saturation level. The saturation level changes when the material feed rate increases or decreases. As a result, the wetting solution is dispensed more when the material feed rate is high, and less when the material feed rate is low. The relationship between feed rate and wetting pump flow rate can be equated by numerous means, mechanical, auger speed sensing, chain speed sensing, material flow rate sensing (using a hall effect, capacitor sensors or even resonate sensors).

In a particular embodiment of the invention, the auger speed is sensed and the pump flow rate from the wetting system is adjusted based on the auger speed. More specifically, the speed of the auger's electric motor is determined based on its back EMF pulse generated when the PWM signal to the auger's motor is turned off. Based on the voltage measurement from the back EMF pulse, the granular material flow rate through the auger can be determined. The wetting system can be automatically activated if the material flow rate, as determined by the back EMF pulse voltage is above a first threshold value, and automatically deactivated if the material flow rate, as determined by the back EMF pulse voltage, is below a second threshold value. In addition to activation and deactivation, the flow rate of the wetting system can be increased or decreased while in an activated state to better match the flow rate of granular material.

The actual map of the flow and material dispensing can be optimized by material type sensing (material types have different signatures that can be recognized: i.e., weight, density, humidity, electrical conductivity, etc.). The sensing can be optimized to mechanical devices that turn on the pump motors, or complex computer controlled devices that monitor multiple material elements to optimize the material output and material saturation.

Another feature of the present invention is the ability to automatically turn on and off a light, or another auxiliary circuit, depending on the conditions. The lighting control circuit includes the microprocessor 202 (shown in FIG. 6), which can be linked to auger 110. More specifically, the back EMF pulse of the auger's electric motor can be monitored so that vehicle lighting can be activated automatically whenever the auger 110 (shown in FIGS. 3 and 4) is activated. Optionally, this automatic lighting feature may be configured to activate upon initiation of other events, such as when the vibrator 116 turns on, when the wetting system turns on, or when the spinner turns on. That is, the back EMF pulse from the electric motors for each of these systems can be monitored to trigger the automatic lighting. As a result, visibility of the material being dispersed, especially at night, is improved so that the end user can adequately verify proper dispersal of anti-icing materials. Typically, at least some, of the lighting will be aimed at the output of the spreader 100.

One benefit of the automatic lighting circuit is the ability to keep the light going, especially during a jam condition. In particular embodiments, instead of completely turning off the light, the light is kept on so that inspection of the spreader 100 (shown in FIG. 1) is possible. Thus, the user does not have to manually turn on the light. If this embodiment, the automatic light is designed to stay on not just when the granular material is being dispensed, but also during a critical jamming event. As explained above, this can be accomplished by monitoring the EMF pulses, or lack thereof, generated by the electric motors of various spreader subsystems.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling a DC motor of a hopper spreader, the method comprising the steps of:
   providing a pulse-width modulated (PWM) signal to operate the DC motor of the hopper spreader;
   measuring a voltage generated by the DC motor of the hopper spreader when the PWM signal is turned off;
   determining a motor speed of the DC motor of the hopper spreader based on the measured voltage;
   measuring current supplied to the DC motor when the PWM signal is turned off;
   controlling the DC motor of the hopper spreader to maintain a relatively constant motor speed which corresponds to a desired motor speed setting, the relatively constant motor speed being maintained with varying loads placed on the DC motor;
   wherein the voltage and current measurements occur within 3 milliseconds of each other.

2. The method of claim 1, wherein controlling the DC motor of the hopper spreader to maintain the relatively constant motor speed comprises controlling the PWM signal to increase the voltage to the DC motor as the load on the DC motor increases, and to decrease the voltage to the DC motor as the load on the DC motor decreases.

3. The method of claim 1, wherein measuring the voltage comprises measuring the voltage using a microprocessor.

4. The method of claim 3, wherein measuring the voltage using a microprocessor comprises measuring the voltage using a microprocessor with an integral analog-to-digital converter.

5. The method of claim 1, further comprising determining a torque produced by the DC motor based on the measured current.

6. The method of claim 5, further comprising utilizing a full torque potential of the DC motor at all speeds of the DC motor.

7. The method of claim 1, further comprising using GPS data to correlate a material dispersion pattern to vehicle location coordinates and/or weather patterns.

8. The method of claim 1, further comprising storing the desired motor speed setting in a microprocessor.

9. The method of claim 1, wherein controlling the DC motor of the hopper spreader to maintain the relatively constant motor speed comprises controlling the DC motor using a microprocessor.

10. A method of controlling a DC motor of a hopper spreader, the method comprising the steps of:
    providing a pulse-width modulated (PWM) signal to operate the DC motor of the hopper spreader;
    measuring a voltage generated by the DC motor of the hopper spreader when the PWM signal is turned off;
    determining a motor speed of the DC motor of the hopper spreader based on the measured voltage;
    controlling the DC motor of the hopper spreader to maintain a relatively constant motor speed which corresponds to a desired motor speed setting, the relatively constant motor speed being maintained with varying loads placed on the DC motor;
    providing a second pulse-width modulated (PWM) signal to operate a second DC motor;
    measuring a voltage generated by the second DC motor when the second PWM signal is turned off; and
    automatically activating a light when the measured voltage indicates that the second DC motor is operating.

11. The method of claim 10, wherein the second DC motor is one of a spinner motor, and a wetting system motor, and the DC motor is one of an auger motor, and a conveyor motor.

12. A method of controlling a DC motor of a hopper spreader, the method comprising the steps of:
providing a pulse-width modulated (PWM) signal to operate the DC motor of the hopper spreader;
measuring a voltage generated by the DC motor of the hopper spreader when the PWM signal is turned off;
determining a motor speed of the DC motor of the hopper spreader based on the measured voltage;
controlling the DC motor of the hopper spreader to maintain a relatively constant motor speed which corresponds to a desired motor speed setting, the relatively constant motor speed being maintained with varying loads placed on the DC motor;
determining a material flow rate through an auger, with an electric motor, by measuring a voltage from the auger's electric motor when a PWM supply voltage to the electric motor is turned off; and
automatically activating a wetting system if the material flow rate is above a first threshold value, and automatically deactivating the wetting system if the material flow rate is below a second threshold value.

13. A motor control system configured to vary a motor speed of one or more DC motors, the system comprising:
a microprocessor coupled to the one or more DC motors, the microprocessor configured to supply a pulse-width-modulated (PWM) signal to the one or more DC motors, the PWM signal providing a voltage to operate the one or more DC motors;
wherein the microprocessor is configured to measure an electric current supplied to the one or more DC motors, and being further configured to measure a voltage generated by the one or more DC motors when the PWM signal is turned off;
wherein the microprocessor is configured to determine a motor speed of the one or more DC motors based on the measured voltage, and further configured to control the motor speed to maintain a relatively constant motor speed with varying loads placed on the one or more DC motors; and
wherein the microprocessor is configured to measure the voltage and measure the current within three milliseconds of each other.

14. The motor control system of claim 13, further comprising an analog-to-digital converter used in the measurement of the voltage generated by the one or more DC motors.

15. The motor control system of claim 13, wherein the microprocessor is configured to maintain the relatively constant motor speed by controlling the PWM signal to increase the voltage to each of the one or more DC motors as the load on that DC motor increases, and to decrease the voltage to each of the one or more DC motors as the load on that DC motor decreases.

16. The motor control system of claim 13, wherein the microprocessor is configured to determine a torque of the one or more DC motors based on the measured current.

17. The motor control system of claim 13, wherein the microprocessor is configured to operate each of the one or more DC motors at full torque at all speeds.

18. The motor control system of claim 13, wherein the microprocessor is configured to use GPS data to correlate a material dispersion pattern to vehicle location coordinates and/or weather patterns.

19. The motor control system of claim 13, further comprising a lighting system, wherein the microprocessor is configured to measure a voltage generated by a second DC motor when the second PWM signal to the second motor is turned off, and further configured to automatically activate the lighting system when the second DC motor is operating.

20. The motor control system of claim 19, wherein the second DC motor is one of an auger motor, a spinner motor, and a wetting system motor.

21. A motor control system configured to vary a motor speed of one or more DC motors, the system comprising:
a microprocessor coupled to the one or more DC motors, the microprocessor configured to supply a pulse-width-modulated (PWM) signal to the one or more DC motors, the PWM signal providing a voltage to operate the one or more DC motors;
wherein the microprocessor is configured to measure an electric current supplied to the one or more DC motors, and being further configured to measure a voltage generated by the one or more DC motors when the PWM signal is turned off;
wherein the microprocessor is configured to determine a motor speed of the one or more DC motors based on the measured voltage, and further configured to control the motor speed to maintain a relatively constant motor speed with varying loads placed on the one or more DC motors; and
wherein the microprocessor is configured to determine a material flow rate through an auger, having an electric motor, by measuring a voltage from the auger's electric motor when a PWM supply voltage to the electric motor is turned off, and further configured to automatically activate a wetting system if the material flow rate is above a first threshold value, and automatically deactivate the wetting system if the material flow rate is below a second threshold value.

* * * * *